(12) United States Patent
Hunt et al.

(10) Patent No.: US 8,820,002 B2
(45) Date of Patent: Sep. 2, 2014

(54) STUD MOUNTED HEADWALL UNIT AND METHOD FOR INSTALLING SAME

(75) Inventors: Barry W. Hunt, Kitchener (CA);
Christopher B. Over, Cambridge (CA);
Michael John Baratto, Milton (CA);
Brendan S. Fernandes, London (CA);
Daniel Soares Costa, Brantford (CA);
Tricia A. Blondin, Milton (CA)

(73) Assignee: Class Inc., Cambridge, Ontario (CA)

( * ) Notice: Subject to any disclaimer, the term of this patent is extended or adjusted under 35 U.S.C. 154(b) by 0 days.

(21) Appl. No.: 13/415,764

(22) Filed: Mar. 8, 2012

(65) Prior Publication Data

US 2013/0061538 A1 Mar. 14, 2013

Related U.S. Application Data

(60) Provisional application No. 61/451,559, filed on Mar. 10, 2011.

(51) Int. Cl.
*E04H 3/08* (2006.01)
*A61G 12/00* (2006.01)
*E04G 21/14* (2006.01)
*E04F 19/00* (2006.01)
*E04B 2/00* (2006.01)

(52) U.S. Cl.
CPC *E04H 3/08* (2013.01); *E04G 21/14* (2013.01); *E04F 19/00* (2013.01); *E04B 2/00* (2013.01); *A61G 12/00* (2013.01)
USPC ............................ 52/27; 52/220.1; 52/745.19

(58) Field of Classification Search
USPC ................. 52/27, 220.1, 220.2, 220.3, 220.5, 52/220.7
See application file for complete search history.

(56) References Cited

U.S. PATENT DOCUMENTS

| 4,338,485 | A | | 7/1982 | Fullenkamp et al. |
| 4,821,470 | A | | 4/1989 | Kappers et al. |
| 4,905,433 | A | * | 3/1990 | Miller ............................ 174/504 |
| 5,653,064 | A | * | 8/1997 | Kappers et al. ................ 52/36.4 |
| 5,756,933 | A | * | 5/1998 | Pitchford et al. ............. 174/481 |
| 6,145,253 | A | * | 11/2000 | Gallant et al. .................. 52/36.1 |
| 6,895,715 | B2 | | 5/2005 | Gallant et al. |
| 7,204,714 | B2 | | 4/2007 | Walker et al. |
| 7,857,354 | B2 | * | 12/2010 | Bally et al. ....................... 285/12 |
| 2003/0177713 | A1 | * | 9/2003 | Walker et al. ................... 52/79.1 |
| 2008/0283291 | A1 | * | 11/2008 | Makwinski et al. .......... 174/481 |

* cited by examiner

*Primary Examiner* — William Gilbert
*Assistant Examiner* — Kyle Walraed-Sullivan
(74) *Attorney, Agent, or Firm* — Bereskin Parr LLP/S.E.N.C.R.L., s.r.l.

(57) ABSTRACT

A headwall unit mountable to at least one wall support member, the at least one wall support member having a wall supporting surface for receiving wall material. The headwall unit includes a frame comprising a back plate mountable to the at least one wall support member so as to overlie the wall supporting surface, the back plate having at least one back port for receiving a medical service carrier through the back plate; and a faceplate attachable to the frame such that the faceplate is spaced apart from the back plate and defines a space therebetween for receiving a fixture, the fixture being connectable to the medical service carrier for supplying a medical service.

21 Claims, 7 Drawing Sheets

STUD MOUNTED HEADWALL UNIT AND METHOD FOR INSTALLING SAME

RELATED APPLICATIONS

This application claims the benefit of U.S. Provisional Patent Application Ser. No. 61/451,559 filed Mar. 10, 2011 and entitled "Stud Mounted Headwall Unit and Method for Installing Same", the entire contents of which are hereby incorporated by reference herein for all purposes.

TECHNICAL FIELD

The embodiments disclosed herein relate to headwall units for use in medical facilities such as such as hospitals, nursing homes, and the like.

INTRODUCTION

Patient care rooms in medical facilities often supply a number of medical services for patient use, including medical gases (such as oxygen and nitrogen), a vacuum line, electricity, emergency power, lighting, nurse call functions, and the like. Some or all of these medical services may be incorporated into a headwall unit located beside a patient's bed, often at the head of the bed, which may provide convenient access to the medical services.

Conventional medical headwall units are often installed after building construction, however, preparations for the headwall unit may occur during building construction. In particular, during construction it is customary to use a template to outline where various fixtures will be located on the headwall unit so that gas pipes and electrical conduits can be routed to dedicated junction boxes at specific locations within a wall. One or more skilled tradespersons may be present during construction to route the gas pipes and electrical conduits. For example, a gasfitter may install and braze the gas pipes, an electrician may install electrical conduits and terminate electrical wiring in dedicated individual electrical junction boxes within the wall, and so on.

Drywall is then installed to cover the gas pipes, electrical conduits, and junction boxes. Then, when installing the headwall unit, cutouts are made in the drywall to expose the junction boxes. The headwall unit is then installed over top of the drywall, and one or more skilled tradespersons can return to connect the headwall unit to the medical services by connecting gas fittings, making electrical connections, and so on, as will be described below.

First, a headwall back plate is installed over top of the drywall. The back plate has ports that are generally aligned with the cutouts in the drywall so that gas pipes and electrical wiring can be routed through the back plate. Gas fixtures and electrical fixtures are then installed on the back plate. As an example, the gas fixtures may include sources of oxygen or air, vacuum lines, and the like. The electrical fixtures may include electrical outlets, emergency power outlets, lighting fixtures, nurse call buttons, and the like.

Additional gas pipes and electrical wiring are then installed between the junction boxes and the fixtures. Finishing components and faceplates are then installed over the fixtures. As a final step, all gas fittings, electrical wiring, and nurse call functions are normally tested and certified for safety reasons, for example, to detect possible gas leaks or electrical short circuits.

The installation of conventional headwall units can be time and labour intensive, particularly because the gas and electrical connections may require work done by skilled trades at two (or more) different times during installation.

Other headwall units are installed in the space between adjacent wall studs. For example, U.S. Pat. No. 7,204,714 (Walker et al.) describes a modular in-wall medical services outlet system for installation in the wall of a structure, wherein the wall comprises wall board defining a wall space. The system comprises a plurality of inter-engageable vertical units. Each unit comprises a vertical frame adapted to be installed in the wall space of the structure.

There are a number of problems associated with the Walker et al. system and other headwall units that are recessed within the walls. For example, recessing the frames within the walls might prevent installation of two headwall units back-to-back in adjacent rooms because each recessed frame may need the wall space behind the wall board. Furthermore, the recessed frames provide little or no soundproofing between adjacent rooms, which may reduce patient privacy. Mounting the frames in the walls may also reduce the fire rating of the walls. In some cases, mounting the frames within the walls may require construction of custom stud walls so as to box in the recessed frames, which can be labour intensive and costly.

SUMMARY

According to some embodiments, there is a headwall unit mountable to a wall stud. The wall stud has a front face for receiving drywall. The headwall unit comprises a frame and a faceplate. The frame comprises a back plate mountable to the wall stud so as to overlie the front face. The back plate has at least one back port for receiving a gas pipe or an electrical conduit. The faceplate is attachable to the frame such that the faceplate is spaced apart from the back plate and defines a space therebetween for receiving a fixture. The fixture is connectable to the gas pipe or the electrical conduit.

According to another embodiment, there is a headwall unit mountable to at least one wall support member. The at least one wall support member has a wall supporting surface for receiving wall material. The headwall unit comprises a frame and a faceplate. The frame comprises a back plate mountable to the at least one wall support member so as to overlie the wall supporting surface. The back plate has at least one back port for receiving a medical service carrier through the back plate. The faceplate is attachable to the frame such that the faceplate is spaced apart from the back plate and defines a space therebetween for receiving a fixture. The fixture is connectable to the medical service carrier for supplying a medical service.

The back plate may be mountable to the at least one wall support member such that the back plate abuts the wall supporting surface.

The back plate may include an angled portion inclined from the wall supporting surface by a junction angle. The at least one back port may be located on the angled portion.

According to yet another embodiment, there is a method of installing a headwall unit on at least one wall support member. The at least one wall support member has a wall supporting surface. The method comprises: providing a frame comprising a back plate, the back plate having at least one back port; mounting the frame to the at least one wall support member such that the back plate overlies the wall supporting surface; extending at least one medical service carrier through the back plate via the at least one back port; installing at least one fixture on the frame and connecting the fixture to the medical service carrier; and after connecting the fixture to the medical service carrier, installing wall material onto the wall supporting surface around the frame. The method may also comprise attaching a faceplate to the frame.

Other aspects and features will become apparent, to those ordinarily skilled in the art, upon review of the following description of some exemplary embodiments.

BRIEF DESCRIPTION OF THE DRAWINGS

The drawings included herewith are for illustrating various examples of articles, methods, and apparatuses of the present specification and are not intended to limit the scope of what is taught in any way. In the drawings.

DETAILED DESCRIPTION

Figure 1:
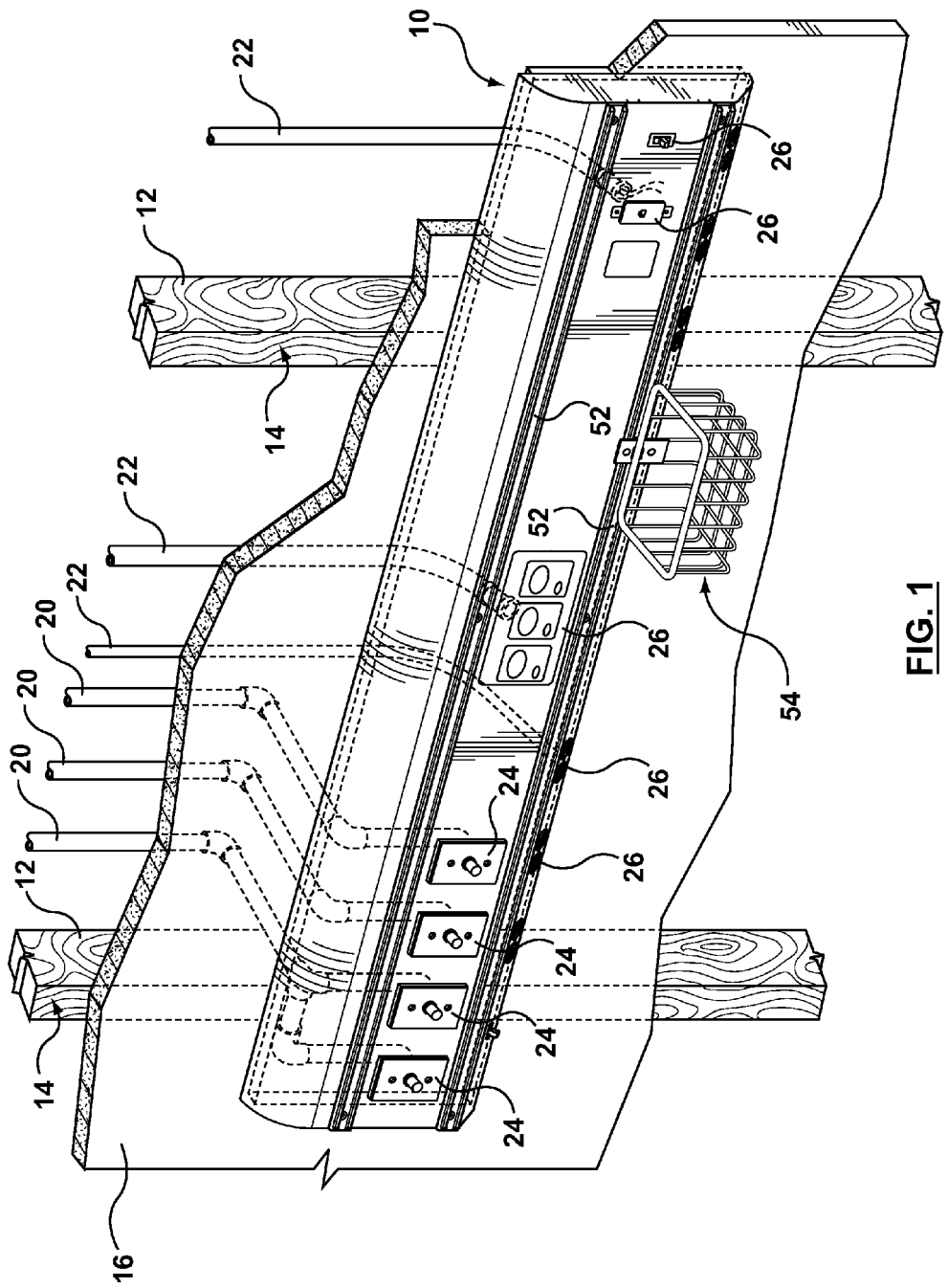
FIG. 1 is a perspective view of a headwall unit mounted to a wall stud according to one embodiment.

Referring to FIG. 1, illustrated therein is a headwall unit 10 for supplying medical gases, electricity and other medical services, for example, to a patient's bedside. The headwall unit 10 is mountable to wall studs 12 or other wall support members. More particularly, the wall studs 12 have a front face 14 (also referred to as a wall supporting surface) normally used for receiving wall material such as drywall 16, and the headwall unit 10 is mounted to the front faces 14 of the wall studs 12 (in some cases directly thereto). The drywall 16 is then placed on the front faces 14 of the wall studs 12 around the headwall unit 10.

As shown, one or more medical service carriers such as gas pipes 20 and electrical wires (e.g. within electrical conduits 22) are located behind the drywall 16 and may be provided between the wall studs 12. The gas pipes 20 and electrical wires are generally connected to corresponding gas fixtures 24 and electrical fixtures 26, which are mounted to the headwall unit 10. The fixtures 24, 26 generally have outlets for supplying the medical services to a patient within a medical facility such as a hospital or a nursing home. For example, the gas fixtures 24 may provide medical gases (such as oxygen, air, and nitrogen), vacuum lines, and the like. Furthermore, the electrical fixtures 26 may include electrical outlets, emergency power outlets, lighting fixtures, nurse call fixtures, and the like.

Figure 2:
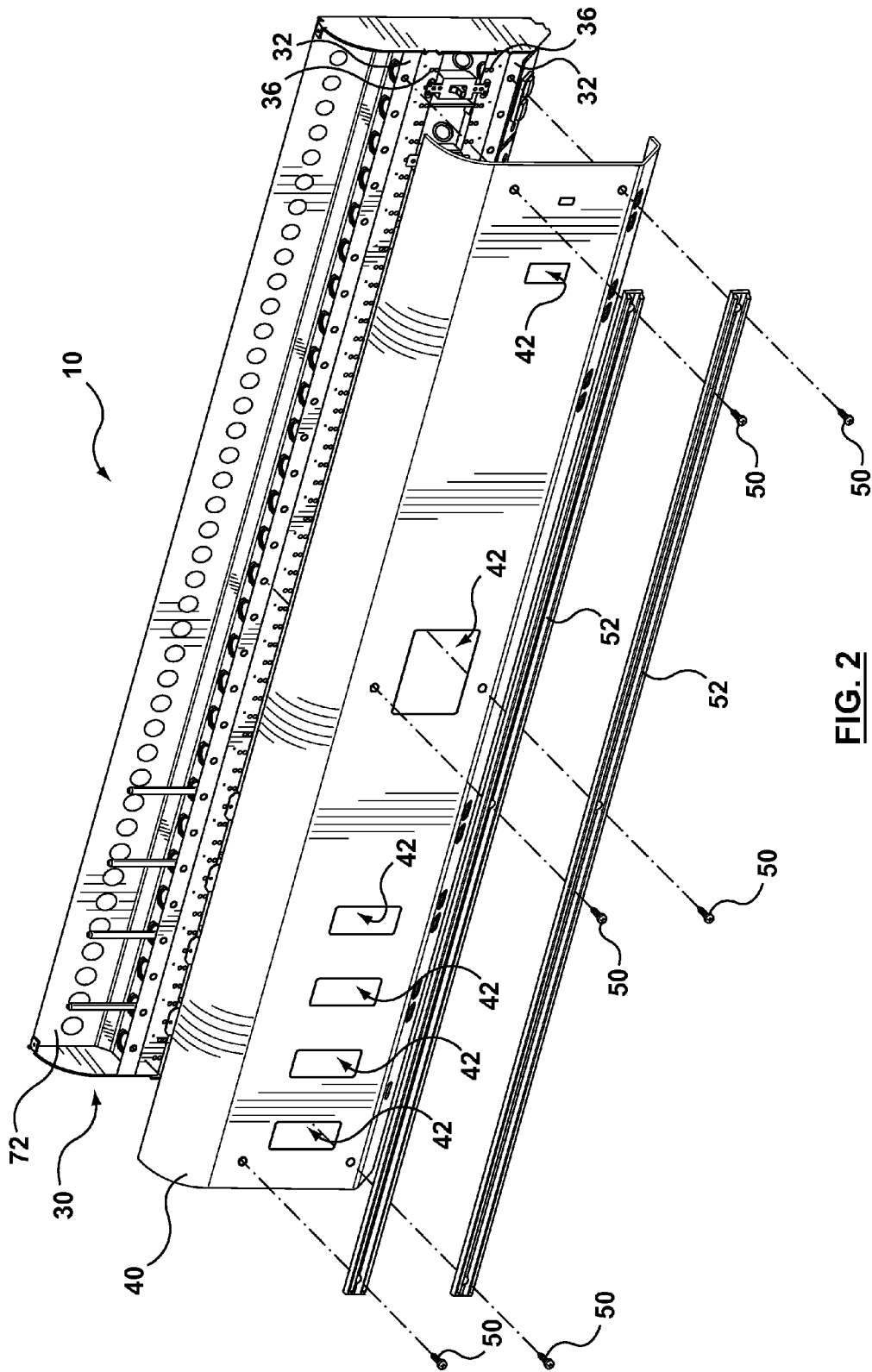
FIG. 2 is a partially exploded perspective view of the headwall unit of FIG. 1.
Figure 3:
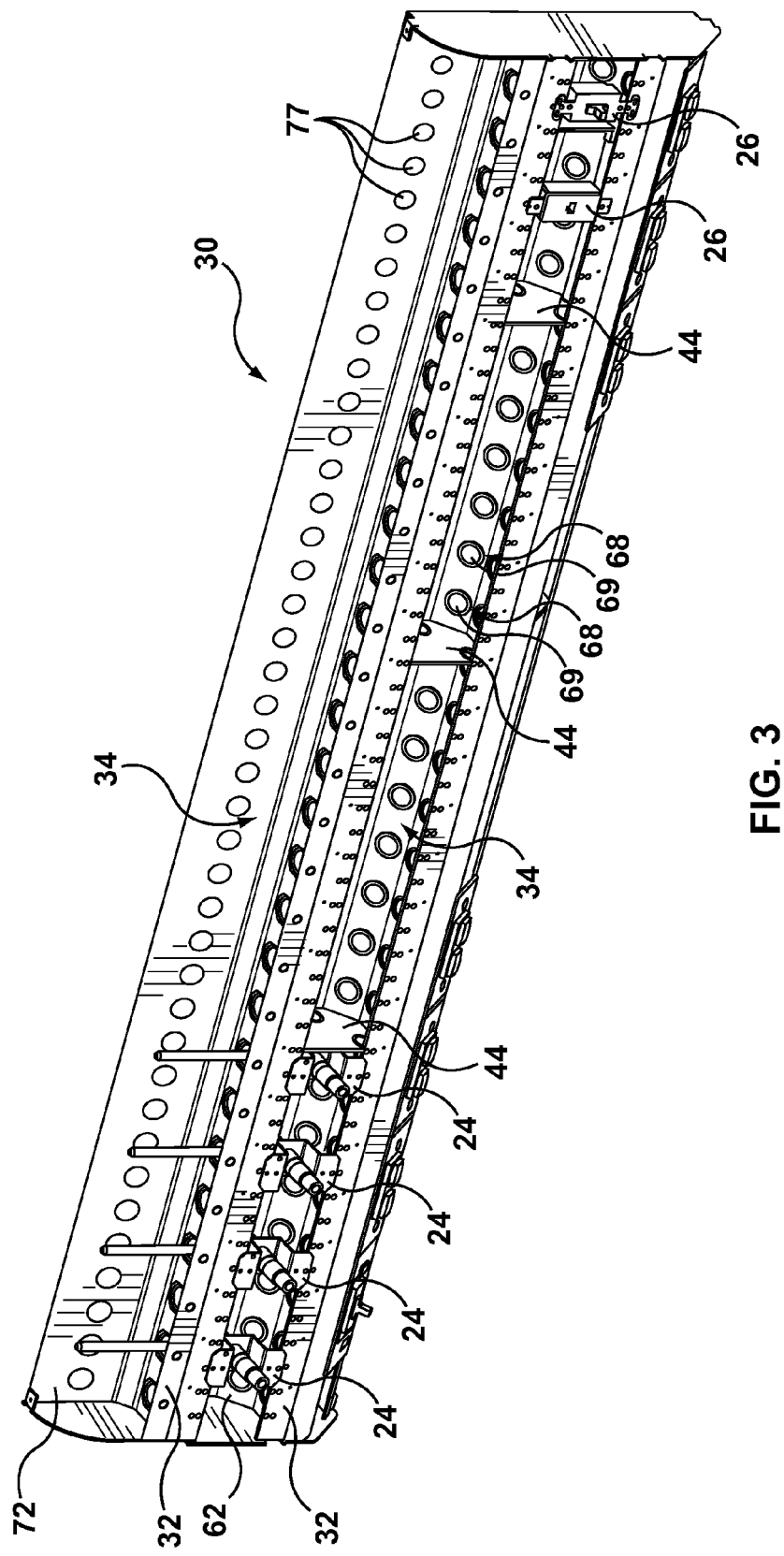
FIG. 3 is a perspective view of a frame of the headwall unit of FIG. 1.

Referring now to FIGS. 2 and 3, the headwall unit 10 generally includes a frame 30 that is mountable to the front face 14 of the wall studs 12, and a faceplate 40 attachable to the frame 30, for example, using fasteners such as screws 50 or bolts.

The frame 30 is generally an elongate structure, which may be sized and shaped to extend across a plurality of wall studs 12. The frame 30 also includes one or more back plates (e.g. back plates 62, 72, and 82 shown in FIGS. 4 and 5) for mounting the frame 30 to the front face 14 of the wall studs 12.

The faceplate 40 is generally attached to the frame 30 such that the faceplate 40 is spaced apart from the back plates (e.g. the back plates 62, 72, and 82) so as to define one or more spaces for receiving the gas fixtures 24 and the electrical fixtures 26. For example, as shown, the frame 30 may have longitudinal ribs 32 that extend outwardly from the back plates toward the faceplate 40. The ribs 32 may define one or more channels 34 for receiving the fixtures 24, 26.

Furthermore, the fixtures 24, 26 may be attached to the ribs 32, for example, using fasteners (not shown) such as screws, bolts, clips and the like. More particularly, the ribs 32 may include apertures 36 for receiving screws or bolts so as to attach the fixtures 24, 26 to the frame 30. Furthermore, the ribs 32 may have a plurality of apertures 36 spaced apart from each other along the length of the frame 30. This spacing may allow fixtures to be attached to the frame 30 at a variety of locations.

The faceplate 40 may also include one or more cutouts 42 for receiving portions of the fixtures 24, 26 therethrough. For example, the cutouts 42 may provide access to outlets on the fixtures, such as nozzles on the gas fixtures 24, and electrical sockets on the electrical fixtures 26. The cutouts 42 may also provide access to switches on the fixtures, such as light switches.

As shown, the frame 30 may include one or more dividers 44 for separating the channels 34 into discrete sections. The dividers 44 may help isolate certain areas of the channels 34 from each other. For example, the dividers 44 may isolate the gas fixtures 24 from the electrical fixtures 26.

As shown in FIG. 2, in some embodiments, one or more rails 52 may be attached to the front of the faceplate 40, for example, using fasteners such as the screws 50. The rails 52 may support one or more objects such as a hanging basket 54 (as shown in FIG. 1).

Figure 4:
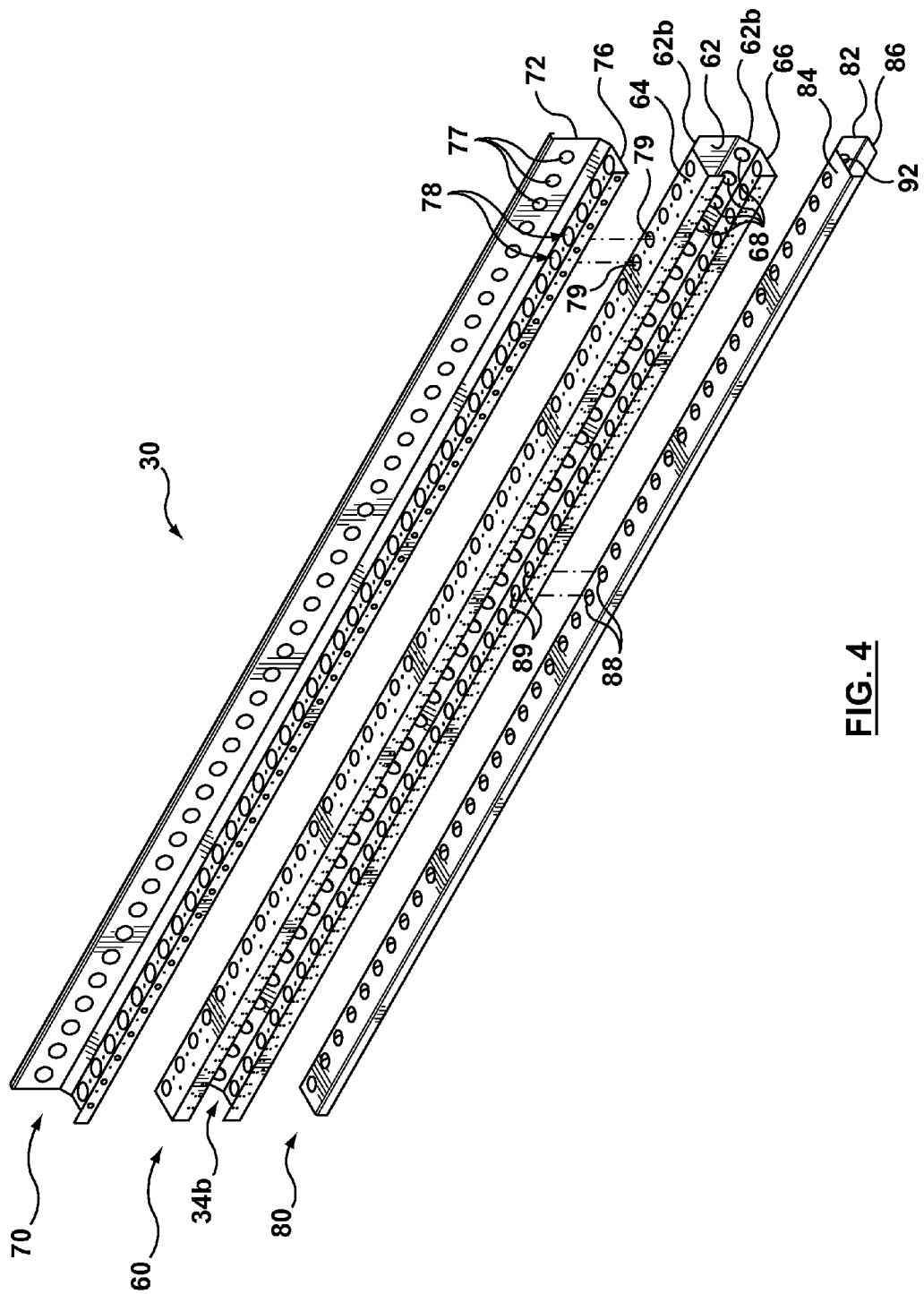
FIG. 4 is a partially exploded perspective view of portions of the frame shown in FIG. 3.
Figure 5:
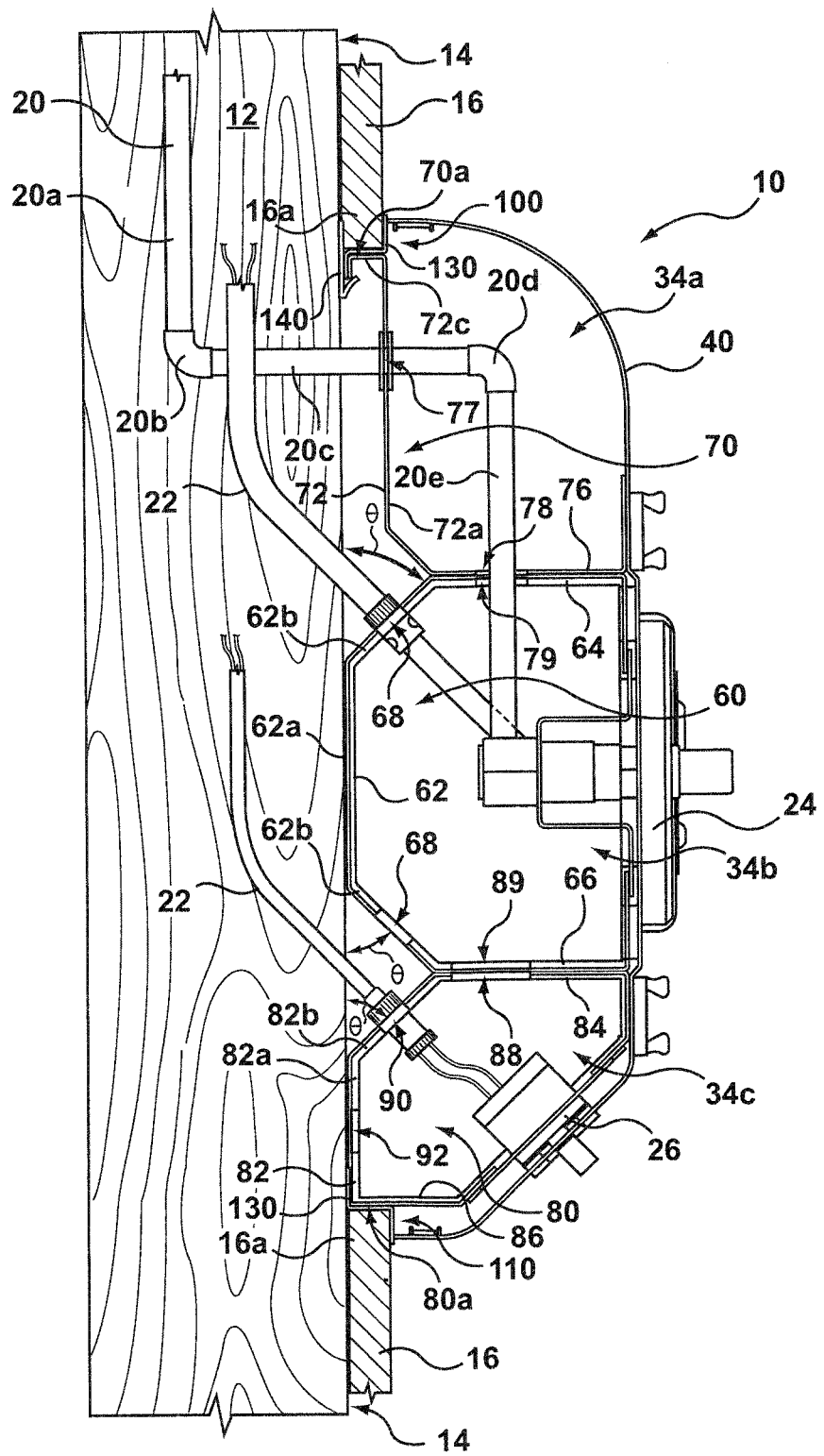
FIG. 5 is a side elevation view of the headwall unit of FIG. 1.

Referring now to FIGS. 4 and 5, in some embodiments the frame 30 may include a main back box 60, an upper back box 70, and a lower back box 80, each of which might extend along the length of the frame 30. As shown, the main back box 60 may be located between the upper back box 70 and the lower back box 80. In particular, the upper back box 70 may be attached to the top of the main back box 60, and the lower back box 80 may be attached to the bottom of the main back box 60, for example, using fasteners such as screws, bolts, clips, welds, and the like.

As shown, the main back box 60 may have a generally C-shaped cross-section that defines a middle channel 34b (e.g. for receiving one or more fixtures). In particular, the main back box 60 may include a back plate 62, a top plate 64, and a bottom plate 66. In some embodiments, the back plate 62, top plate 64, and bottom plate 66 may be integrally formed together, for example, from a sheet of metal.

Referring to FIG. 5, the back plate 62 is generally mountable to the wall stud 12, for example, using fasteners (not shown) such as screws, bolts, nails, and the like. Furthermore, the back plate 62 generally overlies the front face 14 of the wall stud 12.

As shown in FIG. 5, in some embodiments, the back plate 62 may directly abut the front face 14 of the wall stud 12. In other embodiments, there may be a spacer between the back plate 62 and the front face 14. For example, the spacer could include a washer, an elastomeric sealing strip, sound deadening material, and the like.

The back plate 62 also has one or more back ports 68 for receiving one or more medical service carriers through the back plate 62. For example, in FIG. 5, an electrical conduit 22 extends through an upper port 68 within the back plate 62. In some embodiments, electrical wires may extend through the back port 68 without the electrical conduit 22.

The back plate 62 may include a flat portion 62a (which may be generally parallel to the front face 14 of the wall stud 12), and one or more angled portions 62b that are generally inclined relative to the flat portion 62a (and the front face 14) by a junction angle θ. As shown, the back plate 62 may include upper and lower angled portions 62b, which may form transitions from the flat portion 62a to the top plate 64 and the bottom plate 66 respectively.

In some embodiments, the back ports 68 may be located on the angled portions 62b (e.g. back ports 68 are shown on the upper and lower angled portions 62b in FIG. 5). This may allow connection of the electrical conduit 22 to an electrical fixture (not shown in FIG. 5) without the need for a separate junction box.

In particular, safety regulations often require a junction box when a gas pipe or electrical conduit is bent 90-degrees or more, which might be the case if the port 68 were located on the flat portion 62a. Providing the back ports 68 on the angle portions 62b may reduce the number of 90-degree bends, which might thereby reduce the number of junction boxes needed to install the gas pipes or electrical conduits. Furthermore, reducing the number of junction boxes may reduce installation time and associated installation costs.

In some embodiments, the junction angle θ may be selected so as to reduce the need for junction boxes. For example, in some embodiments, the junction angle θ may be between about 20 degrees and about 70 degrees. In some embodiments, the junction angle θ may be between about 30 degrees and about 60 degrees. In some embodiments, the junction angle θ may be between about 40 degrees and about 50 degrees. In some embodiments, the junction angle θ may be about 45 degrees.

In some embodiments, it might be possible to bend the gas pipes 20 or electrical conduits 22 for connection to the frame 30 via the back ports 68 on the angled portions 62b. For example, as shown in FIG. 5, the electrical conduit 22 may have a swept bend (e.g. with a large radius) that allows connection to the back port 68 on the upper angled portion 62b.

As shown in FIG. 4, the back plate 62 may include a plurality of back ports 68 spaced apart intermittently along the length of the frame 30. For example, the back ports 68 may be spaced apart at particular intervals (e.g. 60 millimeter intervals). Spacing the back ports 68 at such intervals might allow gas pipes 20 and electrical conduits 22 to be connected to the headwall unit 10 at various locations along the length of the headwall unit 10.

In some embodiments, the frame 30 may include knockout plates 69 (shown in FIG. 3) for initially covering the back ports 68. Then, when a gas pipe 20 or electrical conduit 22 is being routed through a particular port 68, the knockout plate 69 may be punched out or removed.

The upper back box 70 may be similar in many respects to the main back box 60. For example, the upper back box 70 may include a back plate 72 and a bottom plate 76, which may form a generally L-shaped cross-section that defines an upper channel 34a (e.g. for receiving one or more fixtures, or for receiving gas pipes as will be described below). In some embodiments, the back plate 72 and bottom plate 76 may be integrally formed together, for example, from a sheet of metal.

As shown, the bottom plate 76 may be attached to the top plate 64 of the main back box 60. The plates 64 and 76 may cooperate to define one of the ribs 32 (as shown in FIGS. 2 and 3).

In some embodiments, the back plate 72 may include a flat portion 72a, which may be generally parallel to the front face 14 of the wall stud 12. The back plate 72 may also included folded top portion 72c extending from the top of the flat portion 72a. The folded top portion 72c may be used to mount the frame 30 to the wall studs 12. For instance, a hanger bracket 140 may be attached to the front faces 14 of the wall studs 12, for example, using fasteners such as screws, bolts, nails, and the like. The hanger bracket 140 may in turn support the frame 30 from the folded top portion 72c.

In some embodiments, the back plate 72 may have one or more back ports 77. As shown, the back ports 77 may be located on the flat portion 72a of the back plate 72.

The bottom plate 76 may also have side ports 78, which may be generally aligned with corresponding side ports 79 on the top plate 64 of the main back box 60. The aligned side ports 78 and 79 may allow a gas pipe or an electrical conduit to extend from the upper channel 34a to the middle channel 34b.

As shown in FIG. 5, a gas pipe 20 may be connected to a gas fixture 24 through the back port 77 and the side ports 78 and 79. In particular, the gas pipe 20 may extend behind the drywall 16 along a first vertical pipe portion 20a to a first 90-degree elbow 20b. The gas pipe 20 may then extend from the first elbow 20b along a horizontal pipe portion 20c through the back port 77 to a second 90-degree elbow 20d. The gas pipe 20 may then extend from the second elbow 20d along a second vertical pipe portion 20e through the side ports 78 and 79 to the fixture 24. The pipe connections may be brazed at the elbows 20b and 20d, and at the gas fixture 24.

In some embodiments, the upper back box 70 may be used as a gas barrier. For example, the gas pipes 20 may be received within the upper channel 34a and may be isolated from electrical wires, other pre-piped lines within the wall, pre-wired electrical services within the wall, and the like. The upper back box 70 might also protect the gas pipes 20 during installation, and particularly while brazing the gas pipes 20.

In some embodiments, the upper back box 70 may protect a patient or a patient's room from exposure to contaminants (such as dust) from within the wall cavity behind the drywall 16, particularly if the faceplate 40 is removed, for example, when servicing the headwall unit 10. In some embodiments, there may be seals that help further reduce exposure to contaminants. For example, there may be grommet seals around the gas pipes 20 extending through the back port 77, as shown in FIG. 5. There may also be sealing strips 130 between the headwall unit 10 and the wall, which will be described below.

The lower back box 80 may be similar in many respects to the main back box 60. For example, the lower back box 80 may include a back plate 82, a top plate 84, and a bottom plate 86, which may form a generally C-shaped cross-section that defines a lower channel 34c (e.g. for receiving one or more fixtures). In some embodiments, the back plate 82, top plate 84, and bottom plate 86 may be integrally formed together, for example, from a sheet of metal.

As shown, the top plate 84 may be attached to the bottom plate 66 of the main back box 60. The plates 66 and 84 may cooperate to define one of the ribs 32 (as shown in FIGS. 2 and 3).

The top plate 84 may have side ports 88, which may be generally aligned with corresponding side ports 89 on the bottom plate 66 of the main back box 60. The aligned side ports 88 and 89 may allow a gas pipe or an electrical conduit to extend from the middle channel 34b to the lower channel 34c.

The back plate 82 may be similar to the back plate 62 of the main back box 60 in the sense that the back plate 82 may include a flat portion 82a and an angled portion 82b. The flat portion 82a may directly abut the front face 14 of the wall stud 12, and may be generally parallel thereto. In some embodiments, the flat portion 82a may be mounted to the front face 14 of the wall stud 12, for example, using fasteners such as screws, bolts, nails, and the like.

As shown, the angled portion 82b may be inclined relative to the flat portion 82a (and the wall supporting surface 14) by a junction angle θ.

The back plate 82 may also have one or more back ports, which may be similar to the back ports 68. For example, the back plate 82 may have a plurality of back ports 90 spaced apart along the length of the angled portion 82b. As shown in FIG. 5, an electrical conduit 22 may extend through one of the back ports 90, and the electrical conduit 22 may have a swept bend with a large radius. Providing the back ports 90 on the angled portion 82b may reduce the number of junction boxes used to install the gas pipes and electrical conduits as described above.

The back plate 82 may also include additional back ports 92 spaced apart along the flat portion 82a. These back ports 92 may be used for gas pipes and electrical conduits entering the headwall unit 10 at right angles to the back plate 82, for example, when a junction box has been installed within the wall, or when a 90-degree elbow is used (e.g. as shown for the gas pipe 20 extending into the upper back box 70).

Referring still to FIG. 5, in some embodiments, the headwall unit 10 may include one or more flanges (such as flanges 100 and 110) along the sides of the frame 30. Each flange may define a gap that is sized and shaped to receive an edge portion 16a of the drywall 16 between the flange and the front face 14 of the wall stud 12.

For example, the headwall unit 10 may include an upper flange 100 along a top edge 70a of the upper back box 70. As shown, the faceplate 40 may define the upper flange 100, for example, by overhanging the frame 30 along the top edge 70a.

As shown, the top edge 70a of the upper back box 70 may be defined by the folded top portion 72c of the back plate 72. Furthermore, the folded top portion 72c and may partially support the edge portion 16a of the drywall 16.

The headwall unit 10 may also include a lower flange 110 along a bottom edge 80a of the lower back box 80. As shown, the faceplate 40 may define the lower flange 110, for example, by overhanging the frame 30 along the bottom edge 80a.

In some embodiments, one or more sealing strips 130 may be provided between the headwall unit 10 and the wall. In particular, the sealing strip 130 may be placed within the gap defined by flanges along the sides of the frame 30 (e.g. the flanges 100 and 110). In some embodiments, the sealing strips 130 may be provided at other locations between the faceplate 40 and the drywall 16, or between the frame 30 and the wall studs 12.

The sealing strip 130 may provide a seal between a patient's room and the inner wall cavity. In particular, the sealing strip 130 may reduce the amount of contaminants (such as drywall dust) that pass from the inner wall cavity to the patient's room. This may be beneficial because drywall dust and other contaminants might adversely affect a patient's health.

The sealing strip 130 may also help reduce the amount of contaminants that enter the headwall unit 10 (e.g. the channels 34), which might otherwise contaminate medical gases.

In some embodiments, the sealing strip 130 may be made from an anti-microbial or anti-fungal material, or both. Furthermore, the sealing strip 130 may be made from a flexible or elastomeric material such as an extrusion of silicone rubber or another plastic material, which may include anti-microbial and/or anti-fungal additives. In some embodiments, the sealing strip 130 may include a silver ion based biocidal additive.

As shown in FIG. 5, in some embodiments the sealing strip 130 may have a generally S-shaped cross-section. In other embodiments, the sealing strip 130 may have other shapes such as an h-shaped cross-section, a solid rectangular or circular cross-section, and the like.

Figure 6:
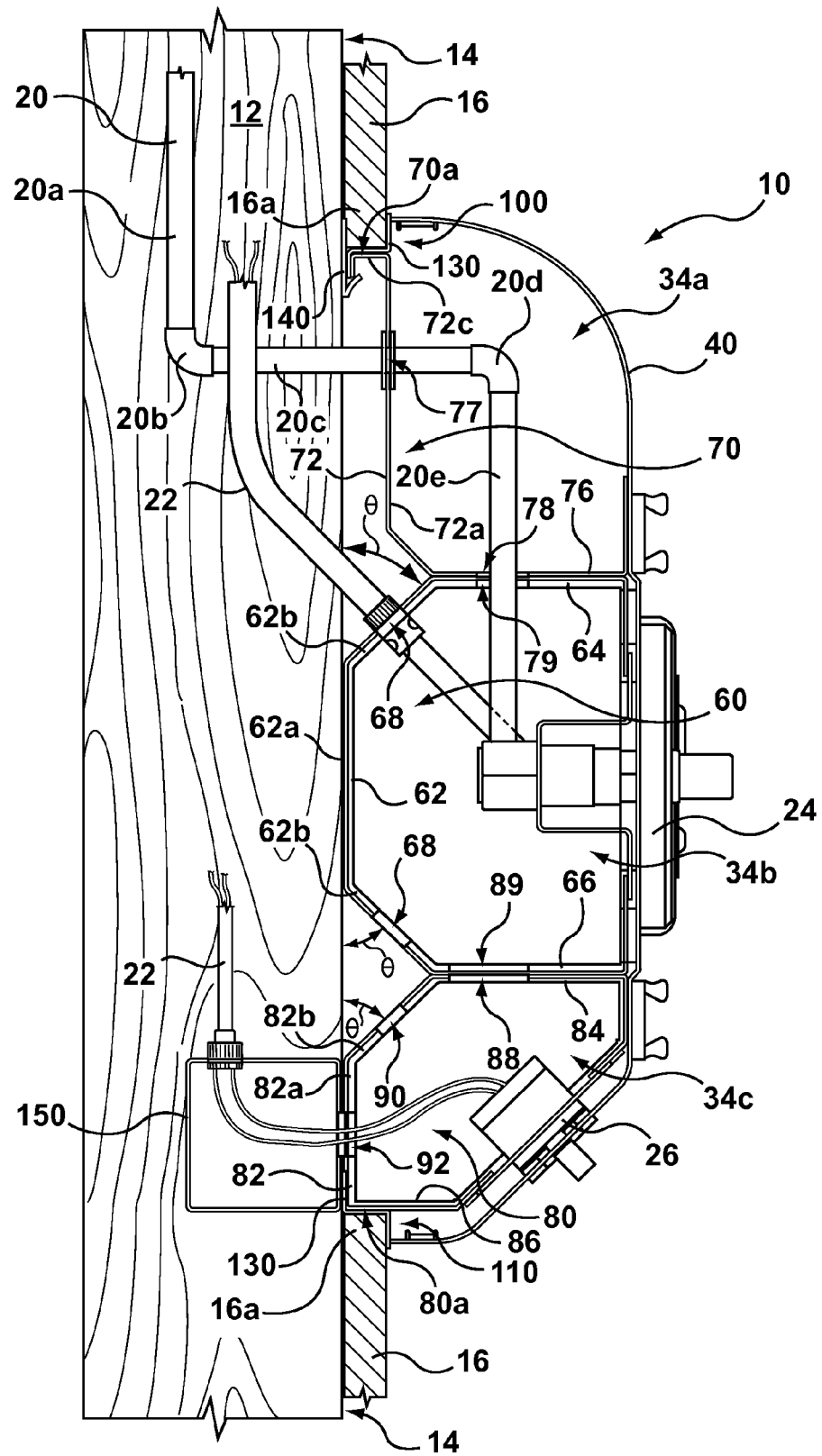
FIG. 6 is a side elevation view of the headwall unit of FIG. 1 having a pull box attached to the back of the headwall unit.

Referring now to FIG. 6, in some embodiments, a pull box 150 or another junction box may be mounted to the back of the frame 30, for example, to allow some medical service carriers to enter the headwall unit 10 at a right angles to the back of the headwall unit (e.g. horizontally). As shown in FIG. 6, the pull box 150 may be mounted to the back plate 82 of the lower back box 80. Furthermore, an electrical conduit 22 may extend vertically to the pull box 150, and electrical wires may extend horizontally into the lower back box 80 via the back port 92 on the flat portion 82a. In this sense, the pull box 150 may be used to route the electrical wires to the back port 92.

Figure 7:
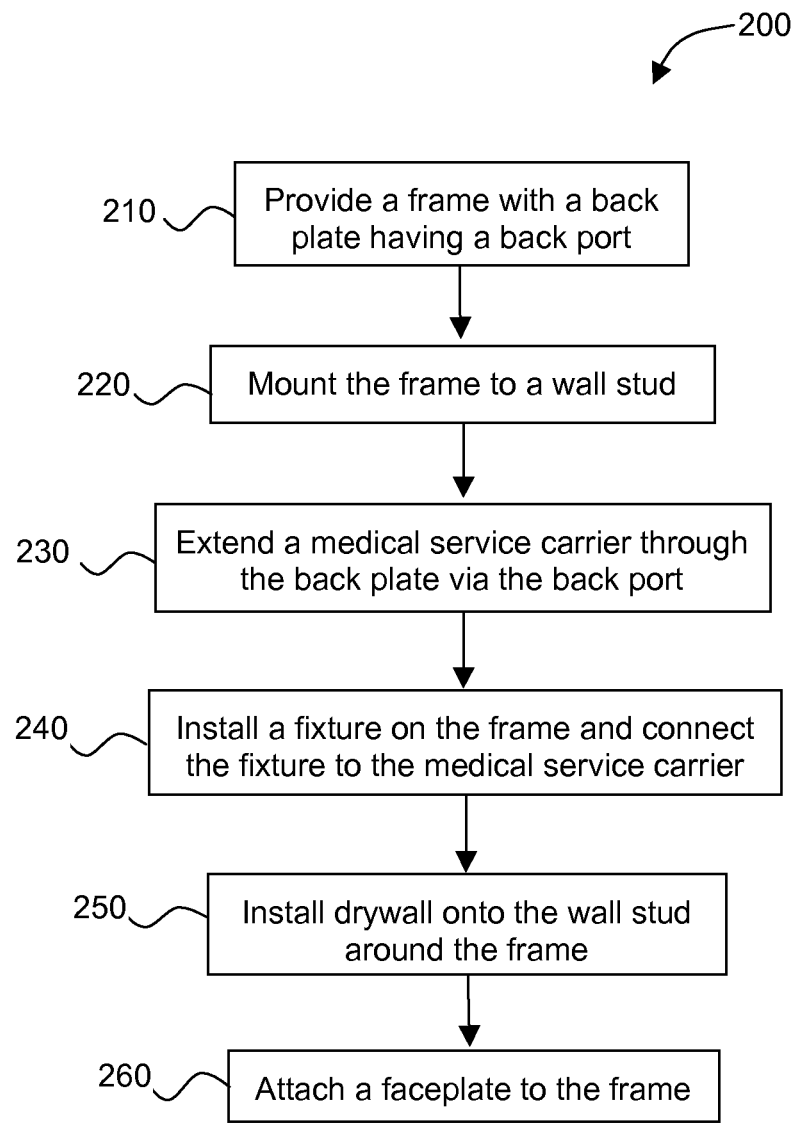
FIG. 7 is a flow chart showing a method of installing a headwall unit according to another embodiment.

Referring now to FIG. 7, there is a method 200 of installing a headwall unit on a wall support member having a wall supporting surface for receiving wall material. For example, the method 200 may be used to install the headwall unit 10 on the front face 14 of one or more wall studs 12.

Step 210 includes providing a frame comprising a back plate, wherein the back plate has at least one back port. For example, step 210 may include providing the frame 30.

Step 220 includes mounting the frame to the at least one wall support member such that the back plate overlies the wall supporting surface. For example, step 220 may include installing the frame 30 on the wall stud 12 such that the back plates 62, 72 and 82 overlie the front face 14 of the wall stud 12.

Step 230 includes extending at least one medical service carrier through the back plate via the at least one back port. For example, step 230 may include extending the gas pipe 20 and/or the electrical wires (e.g. via the electrical conduit 22) through one of the back ports 68, 77, 90 and 92.

Step 240 includes installing at least one fixture on the frame and connecting the fixture to the medical service carrier. For example, step 240 may include installing the gas fixtures 24 or the electrical fixtures 26 on the frame 30. Step 240 may also include connecting the gas pipes 20 to the gas fixtures 24, for example, using brazed connections. Step 240 may also include connecting electrical wiring to the electrical fixtures 26, which may also include connecting the electrical conduits 22 to the frame 30.

Step 250 includes installing wall material onto the wall supporting surface around the frame. For example, step 250 may include installing drywall 16 onto the front faces 14 of the wall studs 12 around the frame 30.

Step 250 generally occurs after connecting the fixtures 24 and 26 to the gas pipes 20 and the electrical conduits 22, which may decrease installation time and installation costs. In particular, the gas and electrical connections can be made all at the same time, as opposed to requiring skilled trades to perform work at two different times during installation.

In contrast, some prior art headwall units require skilled tradespersons to perform work at two or more times during installation. For example, a skilled tradesperson may attend a worksite a first time to route gas pipes and electrical wires to junction boxes. Next, drywall is installed, and then the skilled tradesperson may return to install fixtures and connect the fixtures to the gas pipes and electrical wires. The skilled tradesperson may then inspect and certify all the gas and electrical connections, which might actually be performed on a subsequent third visit.

In contrast, the present headwall unit and method might allow a skilled tradesperson to install all gas pipes, electrical conduits and fixtures at one time before installing the drywall 16, which may reduce installation time and associated installation costs. Furthermore, the gas and electrical connections could be inspected and certified at the same time.

In some embodiments, the method 200 may also include step 260, which may include attaching a faceplate to the frame. In particular, step 260 may include attaching the faceplate 40 to the frame 30, for example, such that the faceplate overhangs the frame 30. More particularly, the faceplate 40 may overhang an edge portion 16a of the drywall 16, which may allow the sealing strip 130 to be installed between the faceplate 40 and the drywall 16.

The headwall units and methods of installation described herein may offer a number of benefits. For example, mounting the headwall unit to the front faces of the wall studs may reduce installation time and associated installation costs by allowing a tradesperson to perform all work in one visit.

Furthermore, mounting the headwall units to the front faces of the wall studs may allow installation of various materials within the inner wall space between the wall studs. For example, those materials may include fire retardant materials, sound deadening materials, and the like.

Furthermore, headwall units and methods of installation described herein may also allow headwall units to be mounted in back-to-back fashion in two adjacent rooms (e.g. having one headwall unit mounted to the front face 14 of a wall stud 12, and another headwall unit mounted to the opposing rear face of the wall stud 12).

While the above description provides examples of one or more apparatus, methods, or systems, it will be appreciated that other apparatus, methods, or systems may be within the scope of the present description as interpreted by one of skill in the art.

The invention claimed is:

1. A wall of a medical facility, the wall comprising:
   at least two wall studs spaced apart from each other, each wall stud having a front face for receiving drywall,
   a headwall unit comprising:
      a frame directly mounted to the wall studs and having a length that extends across the at least two wall studs, the frame comprising at least one exterior back plate overlying the front faces of the wall studs, the exterior back plate having at least one back port; and
      a faceplate attached to the frame and being spaced apart from the exterior back plate to define a space therebetween;
   at least one medical service carrier extending through the back port and into the space between the exterior back plate and the faceplate, the medical service carrier including one of: a gas pipe and an electrical wire; and
   at least one medical service fixture mounted to the frame and being connected to the medical service carrier.

2. The wall of claim 1, wherein the exterior back plate is mounted to the at least two wall studs with the exterior back plate directly abutting the front faces of the wall studs.

3. The wall of claim 1, wherein the exterior back plate includes an angled portion inclined from the front faces of the wall studs by a junction angle, and wherein the at least one back port is located on the angled portion.

4. The wall of claim 3, wherein the junction angle is between about 20 degrees and about 70 degrees.

5. The wall of claim 1, wherein the frame comprises a main back box, and wherein the at least one exterior back plate is part of the main back box.

6. The wall of claim 5, wherein the frame comprises a second back box attached to the main back box, and wherein the second back box includes a second exterior back plate having at least one second back port, and wherein the wall further comprises:
   a second medical service carrier extending through the second back port in the second exterior back plate; and
   a second medical service fixture mounted to the frame within the second back box, the second medical service fixture being connected to the second medical service carrier.

7. The wall of claim 1, further comprising a flange along at least one edge of the frame so as to define a gap that is sized and shaped to receive an edge portion of the drywall between the flange and the studs.

8. The wall of claim 1, further comprising a sealing strip for providing a seal between the faceplate and the drywall.

9. The wall of claim 1, further comprising a pull box mounted to the exterior back plate for routing to the at least one back port.

10. The wall of claim 5, wherein the main back box has a generally C-shaped cross-section that defines a channel for receiving the medical service fixture.

11. The wall of claim 10, wherein the exterior back plate of the main back box includes:
   a middle portion generally parallel to the front faces of the wall studs;
   an upper angled portion inclined from the front faces of the wall studs; and
   a lower angled portion inclined from the front faces of the wall studs.

12. The wall of claim 11, wherein the at least one back port is located on one of the upper angled portion and the lower angled portion.

13. The wall of claim 1, wherein the at least one back port includes a plurality of back ports spaced apart at particular intervals along the length of the frame.

14. The wall of claim 13, wherein the frame includes knockout plates for initially covering the back ports.

15. A wall of a medical facility, the wall comprising:
   at least two wall studs spaced apart from each other, each wall stud having a front face for receiving drywall;
   a headwall unit comprising:
      a frame directly mounted to the wall studs and having a length that extends across the at least two wall studs, the frame comprising a first back box and a second back box mounted to the first back box, the first back box including a first exterior back plate overlying the front faces of the wall studs and having at least one first back port, the second back box including a second exterior back plate overlying the front faces of the wall studs and having at least one second back port; and
      a faceplate attached to the frame, the faceplate being spaced apart from the first exterior back plate to define a first space therebetween and being spaced apart from the second exterior back plate to define a second space therebetween;
   at least one electrical wire extending through the first back port and into the first space between the first exterior back plate and the faceplate;
   at least one medical service electrical fixture mounted to the frame and connected to the electrical wire;

at least one gas pipe extending through the second back port and into the second space between the second exterior back plate and the faceplate; and at least one medical service gas fixture mounted to the frame and being connected to the gas pipe.

16. The wall of claim 15, wherein one of the first exterior back plate and the second exterior back plate is mounted to the wall studs directly abutting the front faces thereof.

17. The wall of claim 15, further comprising a pull box mounted to the first exterior back plate for routing the electrical wire to the first back port.

18. The wall of claim 15, wherein the first back box has a first sidewall with a first side port, and the second back box has a second sidewall with a second side port aligned with the first side port.

19. A method of installing a headwall unit on at least two wall studs that are spaced apart from each other, each wall stud having a front face for receiving drywall, the method comprising:

mounting a frame directly to the wall studs such that the frame extends across the at least two wall studs, the frame comprising at least one exterior back plate that overlies the front faces of the wall studs, the exterior back plate having at least one back port;

extending at least one medical service carrier through the back port in the exterior back plate, the medical service carrier being one of: a gas pipe and an electrical wire;

installing at least one medical service fixture on the frame and connecting the medical service fixture to the medical service carrier; and attaching a faceplate to the frame so as to be spaced apart from the exterior back plate.

20. The method of claim 19, further comprising installing drywall onto the front faces of the wall studs around the frame.

21. The method of claim 19, wherein the frame is mounted to the wall studs such that the exterior back plate is directly adjacent to the front faces of the wall studs.

* * * * *